United States Patent [19]

Arganbright

[11] 4,263,925
[45] Apr. 28, 1981

[54] MULTI-PURPOSE TENT

[76] Inventor: Roy N. Arganbright, Rte. 1, Box 340, Ashland, Wis. 54806

[21] Appl. No.: 2,841

[22] Filed: Jan. 12, 1979

[51] Int. Cl.³ .................. B60P 3/32; E04B 1/347
[52] U.S. Cl. .................. 135/1 A; 135/1 R; 135/3 A
[58] Field of Search .................. 135/1 A, 3 A-3 E, 135/4 A, 5 A, 15 PE; 296/137 R, 100

[56] References Cited

U.S. PATENT DOCUMENTS

| 2,480,509 | 8/1949 | Ripley | 135/3 A |
|---|---|---|---|
| 2,835,262 | 5/1958 | Collins | 135/3 A |
| 3,606,448 | 9/1971 | Walker | 296/105 |
| 3,649,063 | 3/1972 | Stark | 135/1 A X |
| 3,693,641 | 9/1972 | Moss | 135/3 E |
| 3,734,110 | 5/1973 | Burns | 135/1 A |
| 3,737,190 | 6/1973 | Smith et al. | 135/1 A X |
| 3,901,548 | 8/1975 | Seaman, Jr. | 135/1 A X |
| 3,957,069 | 5/1976 | Denaro | 135/15 PE |
| 4,093,302 | 6/1978 | Adams | 135/1 R |

Primary Examiner—J. Karl Bell
Attorney, Agent, or Firm—Dorsey, Windhorst, Hannaford, Whitney & Halladay

[57] ABSTRACT

A multi-purpose tent for mounting to a conventional pick-up truck or staking to the ground having a plurality of tent frame members with a lower support end adapted for insertion into the stake well of a pick-up truck. The portion adapted for insertion into such stake well includes an opening extending therethrough for receiving a tent stake when the same is desired to be staked to the ground.

9 Claims, 9 Drawing Figures

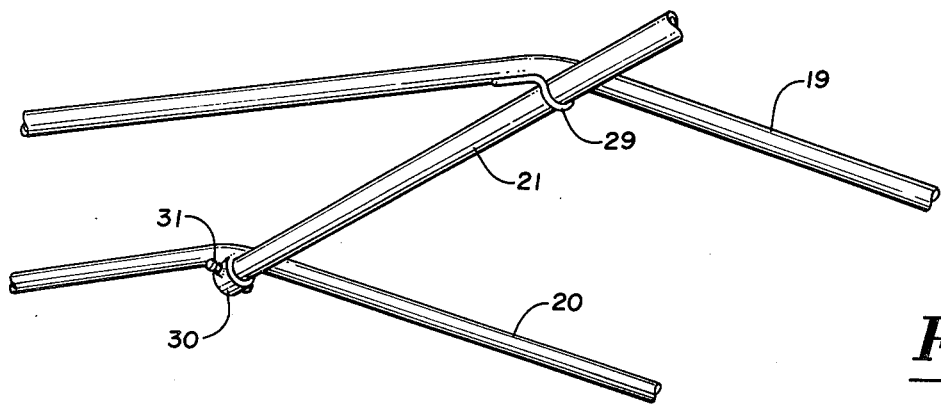
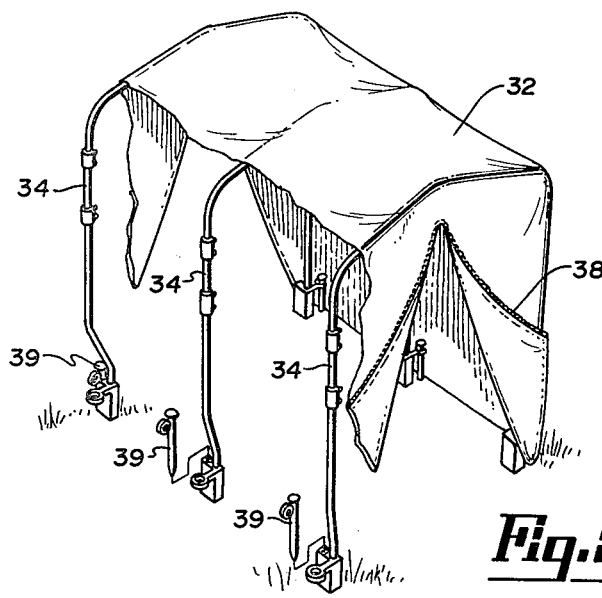
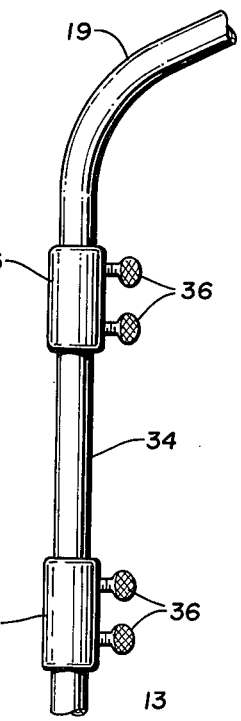
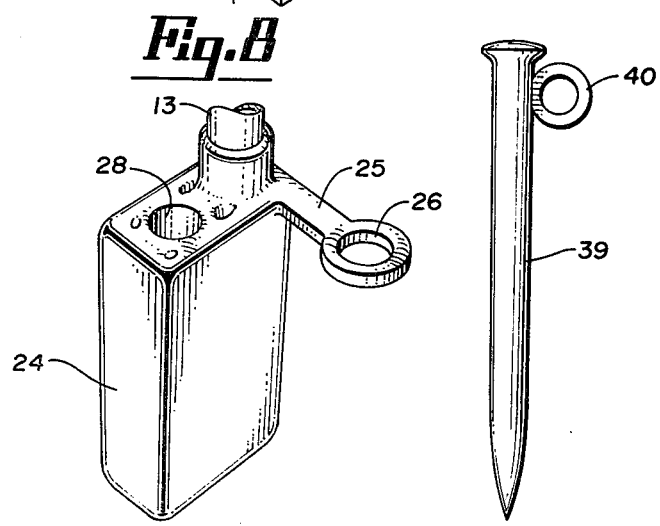
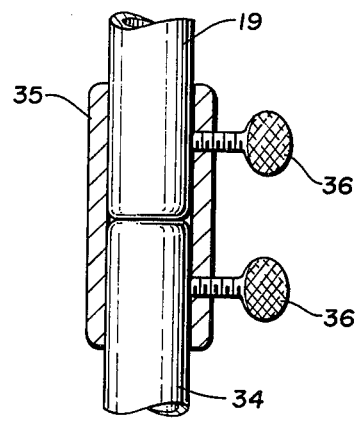

MULTI-PURPOSE TENT

BACKGROUND OF THE INVENTION

The present invention relates generally to the field of tent structures, and more particularly, to an improved multi-purpose tent structure which can be mounted onto a conventional pickup truck or staked to the ground or other supporting surface to serve as a storage tent for a snowmobile or the like or for regular camping purposes.

There are many tent structures existing in the prior art. Some of such structures are adapted for mounting to a vehicle such as a conventional pickup truck, while others are intended for mounting directly to the ground or other supporting surface in a conventional manner. Few, if any, however, are adapted for mounting both onto a pickup truck as well as being staked to the ground since this normally requires special supporting or mounting means capable of supporting the tent structure in both environments. Accordingly, there is a real need for a multi-purpose tent structure having means enabling the tent to be mounted either onto a conventional pickup truck or staked to the ground or other support surface.

SUMMARY OF THE INVENTION

In contrast to the prior art, the present invention relates to a multi-purpose tent structure which can be mounted onto a conventional pickup truck as well as staked to the ground or other supporting surface in a conventional manner. To provide for such features, the structure of the present invention includes an improved mounting means or element enabling the tent to be supported in a variety of ways. The improved mounting element is connected with the lower ends of the tent frame elements and is adapted not only to fit within the stake wells of a conventional pickup truck, but also adapted for accepting a tent stake enabling such element to be staked to the ground or other supporting surface when desired.

Each of the mounting elements includes a generally rectangular shaped base section connected to the lower end of each of the plurality of tent frame members. Such rectangular base sections have dimensions slightly smaller than the stake wells in a conventional pickup truck, enabling the same to be inserted into the stake wells to support the tent above the truck bed. The base sections also include openings extending therethrough to accommodate a stake for securing such section to the ground or other supporting surface when desired. One embodiment of the support element includes a loop or ring section securely connected to the base section for accommodating a further stake when the tent is to be staked to the ground or for securing the tent canvas. This ring or loop section extends outwardly from the base section near its upper edge and also serves to limit the distance which the mounting element can be inserted into the stake.

Accordingly, an object of the present invention is to provide an improved, multi-purpose tent structure which can be staked to the ground or other supporting surface in a conventional manner and can also be mounted onto a conventional pickup truck.

Another object of the present invention is to provide an improved multi-purpose tent structure having an improved mounting element secured to the lower ends of the frame members permitting the tent structure to be mounted in the stake wells of a conventional pickup truck as well as staked to the ground or other supporting surface.

These and other objects of the present invention will become apparent with reference to the drawings, the description of the preferred embodiment and the appended claims.

DESCRIPTION OF THE DRAWINGS

FIG. 4 is a pictorial view showing the upper frame support for the tent structure.

FIG. 5 is a pictorial view showing the multi-purpose tent of the present invention being staked to the ground.

FIG. 6 is a plan view showing a portion of the tent frame structure and the link connecting the two portions of such structure.

FIG. 7 is a plan view, partially in section, showing the means for connecting adjacent sections of the frame structure.

FIG. 8 is a pictorial view of the improved mounting element which has been coated with rubber or other similar substance to reduce vibrations when inserted into the stake wells of a pickup truck.

FIG. 9 is a plan view showing a tent stake utilized with the present invention.

DESCRIPTION OF THE PREFERRED EMBODIMENT

Figure 1:
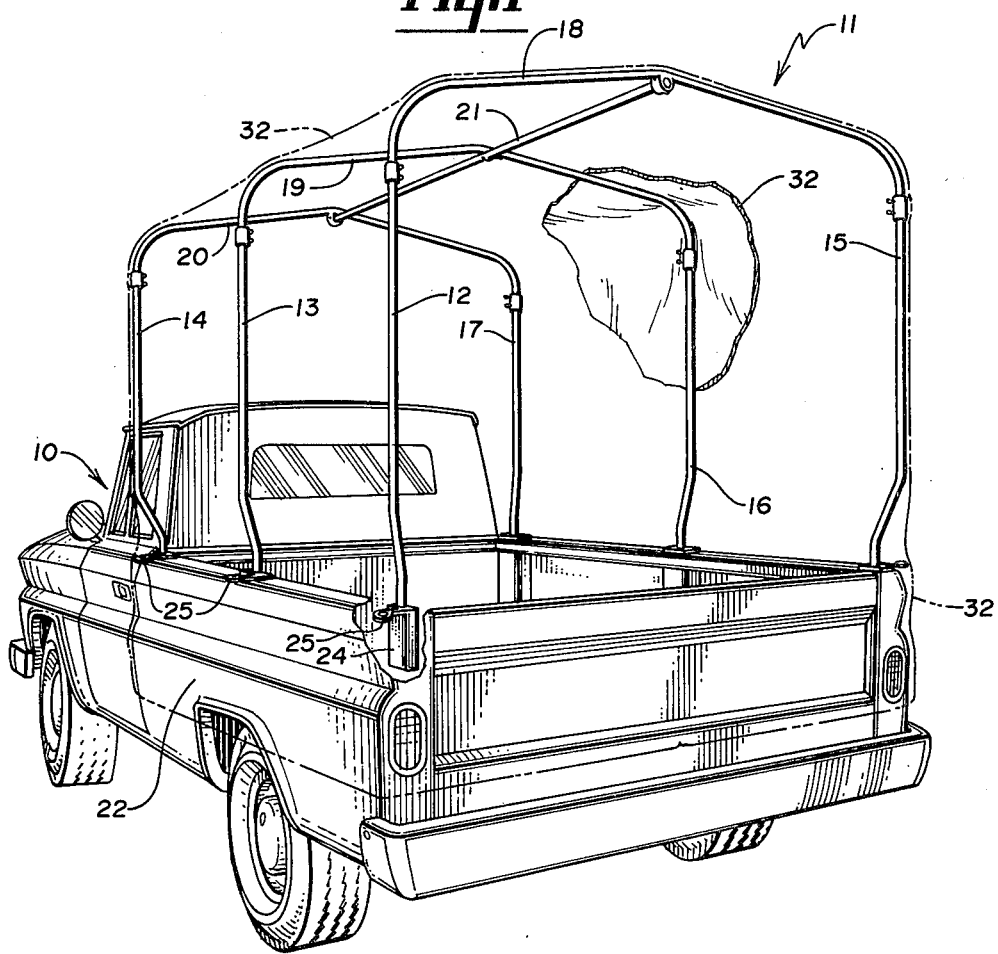
FIG. 1 is a pictorial view of the multi-purpose tent structure of the present invention mounted onto a conventional pickup truck.

Reference is first made to FIG. 1 showing the improved multi-purpose tent structure 11 of the present invention being mounted to a conventional pickup truck 10. As known in the art, conventional pickup trucks include stake wells positioned along the peripheral edges of the truck bed to accommodate, among possible other things, stakes of a gate or side wall to form side walls on the truck bed. The stake wells normally consist of a generally rectangular opening extending vertically into the sides of the truck bed. As partially shown in FIG. 1 at reference numeral 23, these stake wells extend from the top of the side walls to the bed of the truck.

The tent structure includes a plurality of generally vertical tubular frame members 12, 13, 14, 15, 16 and 17, each of which includes one end adapted for mounting into the stake wells of the pickup truck 10 and a second end adapted for connection to an upper frame structure. Each of these vertical frame members 12–17 extends upwardly from the pickup truck and is joined to cooperating upper tubular frame members 18, 19 and 20. In particular, as shown in FIG. 1, the vertical frame members 12 and 15 are connected at their upper ends to the respective ends of the top frame member 18, the vertical frame members 13 and 16 are connected at their upper ends to the ends of the top frame member 19 and the vertical frame members 14 and 17 are connected at their upper ends to the ends of the top frame member 20. Each of the upper frame members 18–20 includes downwardly turned ends for connection with the frame members 12–17.

The connection between various vertical frame members 12-17 and the top frame members 18-20 is accomplished in a manner as illustrated in FIG. 7. While FIG. 7 shows a connection between the top frame member 19 and an intermediate frame member 34 which is used when the tent is staked to the ground, the same type of connection means is utilized to join the vertical frame members 12-17 and the upper frame members 18-20. This connection means includes a cylindrical sleeve member 35 intended to receive and engage a portion of each of the frame members being constructed and a pair of thumb screws 36 threadedly received by the wall of the sleeve member 35. As the thumb screws 36 are tightened, pressure is exerted against the frame members being joined to thereby secure the same together. While the various frame members 12-17 and 18-20 can be constructed of a variety of materials, the frame members of the preferred embodiment are tubular members constructed of a generally light weight metal such as aluminum.

As shown in FIG. 1, joining of the vertical frame members 12-17 with their corresponding top frame members 18-20 form a generally inverted "U" shaped configuration which is intended to support the exterior canvas 32. These three inverted "U" shaped frame structures are secured together by a center support rod 21 securely fastened to each of the top frame members 18 and 20 and near their apex and retained in close association with the centrally positioned top frame element 19 near its apex. As illustrated best in FIG. 4, the center frame member 21 is connected to each of the end top frame members 18 and 20 by a connection means which includes a generally cylindrically shaped sleeve section 30 and a setscrew 31 threadedly received by the sleeve 30. The sleeve section 30 is rigidly secured to the frame members 18 and 20 and is adapted to receive one end of the center rod 21. As the setscrew 31 is tightened, the end of the center rod 21 is secured in the sleeve 30. The means for retaining the center rod 21 with respect to the centrally positioned top frame member 19 consists of the retaining element 29. The element 29 is an elongated element having a portion rigidly secured to the underside of the top frame member 19 and having a curved portion for supporting the center rod 21 is close association with the apex of the top frame member 19.

Figure 2:
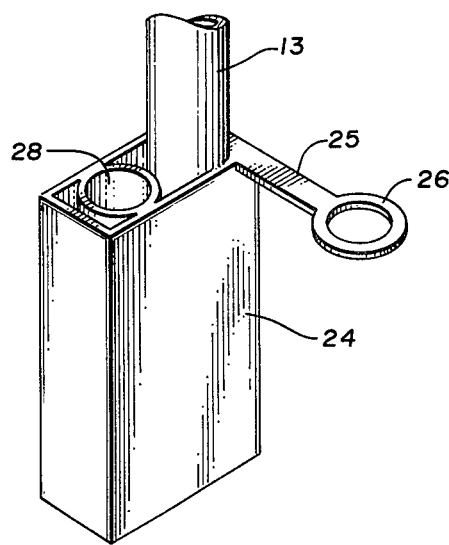
FIG. 2 is a pictorial view showing one of the improved mounting elements which is secured to the lower end of each of the generally upstanding tent frame members.
Figure 3:
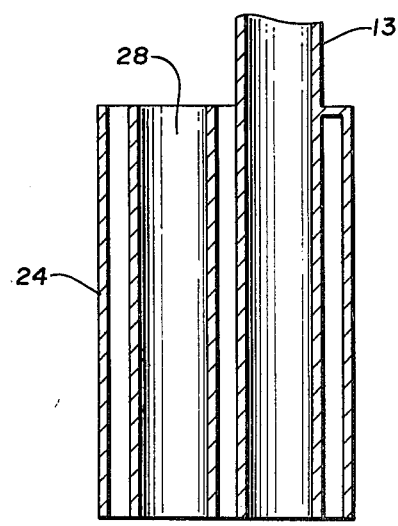
FIG. 3 is a sectional view as viewed along the line 3—3 of FIG. 2.

As best illustrated in FIGS. 2 and 3, the lower ends of each of the vertical frame members 12-17 is rigidly secured to a mounting or support element 24. FIGS. 2 and 3 show the vertical frame member 13 connected with the element 24, but is illustrative of the manner in which each of the other frame members 12 and 14-17 is connected to its corresponding mounting element 24. Each of the elements 24 is a generally rectangular shaped member constructed of a metal or other similarly rigid material. The lower end of each of the frame members 12-17 is secured within the portion of the mounting member 24 by welding or other conventional means. The element 24 comprises a generally rectangular shaped base section and includes an opening 28 extending vertically therethrough. In the preferred embodiment, this opening 28 is formed by utilizing a short ¾ inch pipe section and welding the same within the generally rectangular base of the mounting element 24. In the preferred embodiment, the lower end of the frame members 12-17 is disposed within the element 24 on one side, while the opening 28 is disposed on the other side. As will be described below with respect to FIG. 5, the opening 28 is designed to accept a tent stake when the tent structure is desired to be staked to the ground or other supporting surface.

The support or mounting element 24 also includes a combination stop member-canvas securing member extending outwardly from the upper edge of the element 24. In the preferred embodiment, this member comprises the generally elongated section 25 extending outwardly from the member 24 and terminating in a loop or ring member 26. This section 25 serves as a stop member or a means for limiting the insertion of the element 24 into the stake wells of a pickup truck (FIG. 1) and also as a support for the loop or ring member 26 which is adapted either to accept a second stake member for staking at an angle or for securing the canvas to the frame structure with a rubber strap or snuber when the tent is mounted on a truck. In the preferred embodiment, the sections 25 associated with the center mounting members 24 extends outwardly at right angles, while those sections 25 associated with the outer mounting members 24 extend outwardly at approximately a 45° angle. In the forward members 24, the sections 25 extend forwardly at 45° and in the rearward members 24, the sections 25 extend rearwardly at 45°. The dimensions of the mounting element 24 are slightly smaller than the dimensions of the conventional stake wells of a pickup truck so that the mounting elements 24 can be easily inserted therein. In the preferred embodiment, the dimensions of the rectangular sections are 1¼"×2" while the stake wells are about 1 3/8"×2".

Reference is next made to FIG. 9, showing the tent structure as it is mounted to the ground or other support surface. As shown, the tent structure can be supported and staked to the ground by conventional tent stakes 39 which are inserted into the openings 28 is each of the mounting elements 24. If additional holding or staking force is necessary or desirable or if staking at an angle is desired, a second stake can be inserted into the ring or loop 26. In such case, the tent stake should preferably be of the type illustrated in FIG. 9 having an elongated shaft and a ring or loop member 40 rigidly secured to the upper end of the stake 39. With such a stake, the loop 40 can be used to secure the canvas to the stake in a conventional manner.

When the tent structure is supported on the ground or other supporting surface as shown in FIG. 9, an extension member 34 is intended to be inserted between each of the vertical frame members 12-17 and their corresponding top frame members 18, 19 and 20. This extension 34 raises the height of the tent structure and compensates for the depth of the pickup truck bed when the tent structure is mounted to the truck. This extension 34 is also illustrated in FIG. 6 and includes a tubular section approximately 14" long which is secured at its lower end to one of the vertical frame members 12-17 and at its upper end to an end of a corresponding top frame member 18-20. The means for connecting these various elements is similar to the structure illustrated in FIG. 7 which has been previously described.

The tent frame which has been previously described is intended to be covered in a conventional manner by a canvas 32 (FIG. 1 and 5). The tent canvas itself can include a zipper 38 either at one end if the tent structure is intended to be used only for conventional camping purposes or a zipper 38 at both ends if the tent is to be used, for example, to store or house a snowmobile. In such event, the snowmobile can be driven in one end and out the other.

In a further embodiment of the mounting member 24 illustrated in FIG. 8, the element 24 can be coated with silicone rubber or other similar material to prevent vibration when inserted into the stake wells of a pickup truck. FIG. 8 shows the element 24 and related structure as coated with a silicone rubber material.

Having described the structure of the present invention, the use and operation can be understood as follows. If the tent structure is desired to be mounted to a pickup truck, the various support frame members are connected together so as to form the inverted "U" shaped sections illustrated in FIG. 1. Each of these three sections is then mounted onto the bed of the pickup truck by inserting the lower mounting elements 24 of each section into the stake wells of the truck. As described, the sections 25 limit the insertion of the members 24 into the stake wells. The center rod 21 is then appropriately secured with respect to the upper frame members. The canvas is then placed over the frame structure and secured in a conventional manner to the loops 26. The tent structure is then ready for use. If the structure is desired to be mounted on the ground or other supporting surface, the extension links 34 are inserted into the frame structure and the various inverted "U" shaped sections are staked to the ground by tent stakes 38 (FIG. 5). The tent canvas is then applied over the supporting frame structure and the tent is ready for use. The tent structure of the present invention can be used for many purposes including, among possible others, as a truck camper tent, as a storage tent for a lawn mower, garden tractor or the like, as an ice fishing tent as a drive through snowmobile shelter or as a spear fishing shack.

Although the description of the preferred embodiment has been quite specific, it is contemplated that various modifications could be made to the structure of the present invention without deviating from the spirit thereof. Accordingly, it is intended that the scope of the present invention be dictated by the appended claims rather than by the description of the preferred embodiment.

I claim:

1. A multi-purpose tent for mounting to a conventional pickup truck or for staking to the ground or other supporting surface, said tent comprising:
   a plurality of tent frame members each having a lower support end;
   a mounting member rigidly secured to the lower support end of each of said frame members, said mounting member including a portion adapted for insertion into the stake well of a pickup truck and an opening extending through said portion on one side thereof for receiving a tent stake; and
   a canvas covering said frame members.

2. The tent of claim 1 wherein said frame members include a plurality of upper frame members and a pair of generally vertical frame members extending downwardly from the ends of said upper frame members.

3. The tent of claim 2 wherein said frame members includes a frame extension to be inserted between each of said vertical frame members and its corresponding frame members when the tent is staked to the ground or other supporting surface.

4. A multi-purpose tent adapted for mounting to a conventional pickup truck or for staking to the ground or other supporting surface, said tent comprising:
   a plurality of tent frame members each having a lower support end;
   a mounting member rigidly secured to the lower support end of each of said frame members, said mounting member including a portion adapted for insertion into the stake well of a pickup truck and means for receiving a tent stake;
   stop means for limiting the distance of insertion of said mounting member into the stake well; and
   a canvas said frame members.

5. A multi purpose tent adapted for mounting to a conventional pickup truck or for staking to the ground or other supporting surface, said tent comprising:
   a plurality of tent frame members each having a lower support end;
   a generally rectangular shaped mounting member rigidly secured to the lower support end of each of said frame members, said mounting member including a portion adapted for insertion into the stake well of a pickup truck and means for receiving a tent stake including an opening extending through said rectangularly shaped member on one side thereof; and
   a canvas covering said frame members.

6. The tent of claim 5 including stop means for limiting the distance of insertion of said mounting member into the stake well.

7. The tent of claim 6 wherein said stop member includes a loop member rigidly secured to, and extending outwardly from the top edge of, said rectangularly shaped member.

8. The tent of claim 7 wherein said loop member is adapted to receive a tent stake for staking the tent at an angle when supported on the ground or other surface.

9. The tent of claim 7 wherein said rectangularly shaped member is coated with a rubber material.

* * * * *